United States Patent [19]

Hieda

[11] Patent Number: 5,481,317
[45] Date of Patent: Jan. 2, 1996

[54] GAMMA CORRECTION CIRCUIT WHICH SELECTS ONE OF A PLURALITY OF GAMMA CORRECTED SIGNALS AS AN OUTPUT SIGNAL BASED ON THE LEVEL OF AN INPUT SIGNAL

[75] Inventor: Teruo Hieda, Yokohama, Japan

[73] Assignee: Canon Kabushiki Kaisha, Tokyo, Japan

[21] Appl. No.: 302,943

[22] Filed: Sep. 9, 1994

Related U.S. Application Data

[63] Continuation of Ser. No. 3,482, Jan. 12, 1993, abandoned.

[30] Foreign Application Priority Data

Jan. 14, 1992 [JP] Japan .................... 4-023313

[51] Int. Cl.[6] .................. H04N 5/202; H04N 9/69
[52] U.S. Cl. .......................... 348/674; 348/254
[58] Field of Search .................. ; 348/254, 674, 348/675, 671; 358/519; H04N 9/69, 5/20, 5/202

[56] References Cited

U.S. PATENT DOCUMENTS

| | | | |
|---|---|---|---|
| 3,752,905 | 8/1973 | Schneider | 358/164 |
| 4,805,013 | 2/1989 | Dei et al. | 358/32 |
| 4,931,864 | 6/1990 | Kawamura et al. | 358/32 |
| 4,962,433 | 10/1990 | Matsushima | 358/164 |
| 5,070,405 | 12/1991 | Ejima et al. | 358/164 X |
| 5,089,890 | 2/1992 | Takayama | 358/164 |
| 5,132,796 | 7/1992 | Topper et al. | 358/164 |
| 5,175,621 | 12/1992 | Maesato | 358/164 |

*Primary Examiner*—Victor R. Kostak
*Assistant Examiner*—John W. Miller
*Attorney, Agent, or Firm*—Fitzpatrick, Cella, Harper & Scinto

[57] ABSTRACT

A gamma correction circuit includes a plurality of gamma function forming circuits, each of which modifies an input signal to provide different gamma correction signals. The input signal level is compared with a predetermined signal level, and based on the comparison one of the different gamma correction signals is selected as an output signal of the gamma correction circuit.

6 Claims, 3 Drawing Sheets

GAMMA CORRECTION CIRCUIT WHICH SELECTS ONE OF A PLURALITY OF GAMMA CORRECTED SIGNALS AS AN OUTPUT SIGNAL BASED ON THE LEVEL OF AN INPUT SIGNAL

This application is a continuation of application Ser. No. 08/003,482 filed Jan. 12, 1993, now abandoned.

BACKGROUND OF THE INVENTION

1. Field of the Invention

The present invention relates to a gamma correction circuit and an image pickup apparatus using such a circuit. In particular, the invention relates to a gamma correction circuit in an apparatus for executing a digital signal process, and an image pickup apparatus using such a circuit.

2. Related Background Art

Miniaturization and reduction in weight of an image pickup apparatus progress in association with the advancement of recent electronic technologies. Among those technologies, are high speed analog/digital converters (hereinafter, referred to as an A/D converters) and digital/analog converters (hereinafter, referred to as a D/A converters) which have been put into practical use. Methods of digital signal processing of a video signal which has been converted into a digital signal using A/D and D/A converters has been proposed with the advancement of semiconductor techniques. According to those methods, the image pickup signal is A/D converted, and signal processing such as filtering, color separation, gamma correction, matrix conversion, and the like are executed by digital processes, and the resultant digital processed signal is D/A converted and output to a utilization device.

However, in an image pickup apparatus using the digital signal processes which has hitherto been proposed, the size of the circuit is large. For example, if a read only memory (ROM) is used to construct a gamma correction circuit, the size such a ROM is large. When all of the signal processing circuits are integrated into a single integrated circuit, therefore, it is difficult to reduce the costs.

SUMMARY OF THE INVENTION

It is an object of the invention to solve the problems of the above conventional apparatus.

To accomplish the above object, an embodiment of the present invention comprises: a plurality of function forming means each for providing a predetermined function from an input signal; comparing means for comparing an input value of the input signal with a predetermined value; and selecting means for selecting one of a plurality of outputs of the plurality of function forming means in accordance with an output of the comparing means.

According to an embodiment of the invention, a plurality of function outputs are formed from the input signal by a plurality of function forming means and one of the plurality of function outputs of the function forming means is selected by the selecting means in accordance with the output of the comparing means for comparing the input value of the input signal and the predetermined value, thereby performing the gamma correction.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will be described in detail hereinbelow with reference to the drawings.

Figure 1:
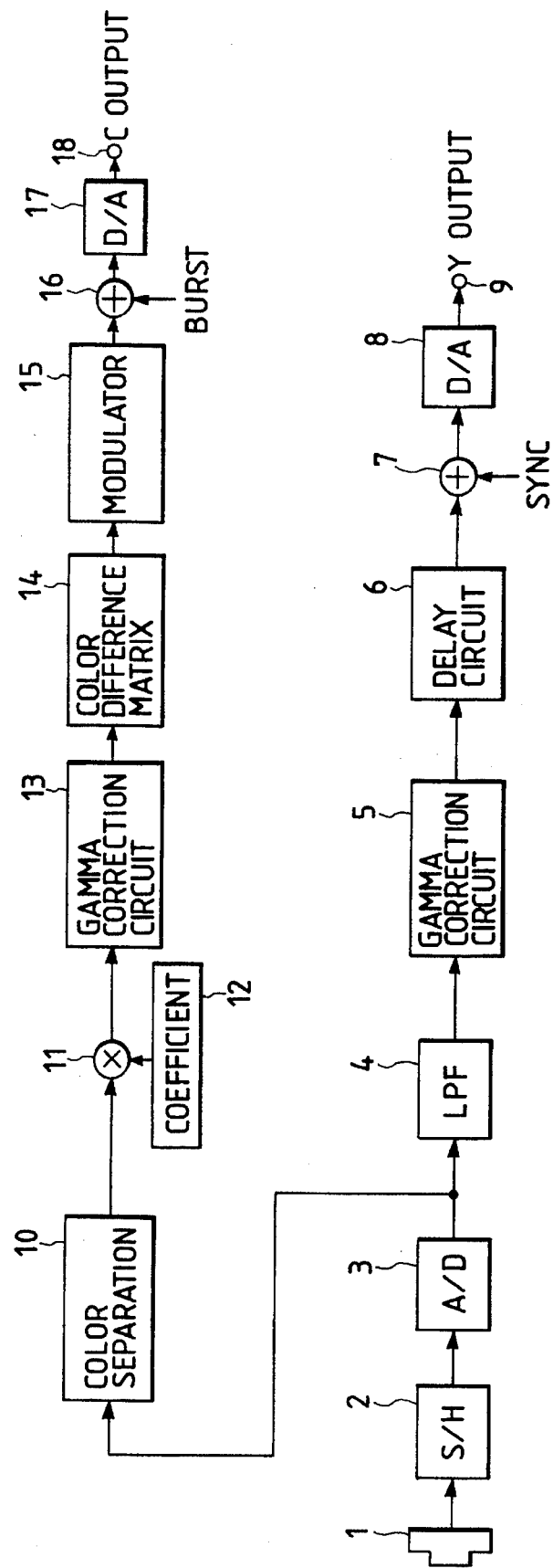
FIG. 1 is a block diagram of an image pickup apparatus using a gamma correction circuit according to the present invention.

FIG. 1 is a block diagram of an image pickup apparatus using a gamma correction circuit of the present invention.

In the diagram, reference numeral 1 denotes a Charge Coupled Device (CCD) as an image pickup device in which color separation filters of a complementary color mosaic of $Y_e$, $C_y$, $M_g$, and G are arranged on the front surface. Reference numeral 2 denotes a Sample and Hold (S/H) circuit to convert an output signal of the CCD 1 into a continuous signal; numeral 3 is an A/D converter to convert an output signal of the S/H circuit 2 into a digital signal; numeral 4 is a low pass filter (LPF) for allowing only a luminance signal in an image pickup signal from the A/D converter 3 to pass; numeral 5 is a gamma correction circuit; numeral 6 is a delay circuit to match delay times of color signals, which will be explained shortly, and the luminance signal; numeral 7 is a sync adding circuit; numeral 8 is a D/A converter; numeral 9 is a luminance signal (Y) output terminal; and numeral 10 is a color separation circuit used to separate the color signals from the image pickup signal from the A/D converter 3. In this embodiment, color signals R, G, and B of pure colors are produced from the signals of the complementary color systems by a color separation matrix operation. Reference numeral 11 denotes a multiplier used to match a white balance; signal with the color signal numeral 12 is a coefficient circuit for providing the white balance signal; numeral 13 is a gamma correction circuit a time-shared gamma correction of the R, G, and B signals; numeral 14 is a color difference matrix circuit to synthesize color difference signals; numeral 15 is a modulator to modulate the color difference signals by a color sub-carrier; numeral 16 is a burst adder; numeral 17 is a D/A converter; and numeral 18 is a color signal (C) output terminal.

An object image (not shown) which has been formed on the CCD 1 by an optical system (not shown) is color separated by the CCD 1. Next, it is photoelectrically converted into an electric signal. The electric signal is converted to a continuous signal by the S/H circuit 2 and is analog-to-digital converted by the A/D converter 3. First, the luminance signal is filtered by the LPF 4 and is gamma corrected by the gamma correction circuit 5 and is delayed a predetermined time by the delay circuit 6. Next, a sync signal is added to the delayed signal by the sync adding circuit 7. An output signal of the sync adding circuit 7 is then converted to an analog signal by the D/A converter 8 and the analog output signal is provided to an external apparatus (not shown) such as a television, VTR, or the like through Y output terminal 9.

In addition, the output signal of the A/D converter 3 is separated into primary color signals R, G, and B by the color separation circuit 10. Coefficients set by the coefficient circuit 12 are multiplied to the primary color signals of R, G, and B by the multiplier 11 and a white balance is performed to match the levels of R, G, and B. The resultant signals are gamma corrected by the gamma correction circuit 13 and the color difference signals from the gamma correction circuit 13 are synthesized by the color difference matrix circuit 14. The synthesized signal is orthogonally orthogonal modulated by the color sub-carrier by the modulator 15. A color burst is added to the modulated signal from the modulator 15 by the burst adder 16. An output signal of the burst adder 16 is converted into an analog signal by the D/A converter 17. The analog signal is provided from the C output terminal 18 in a manner similar to the provision of the Y signal.

Figure 2:
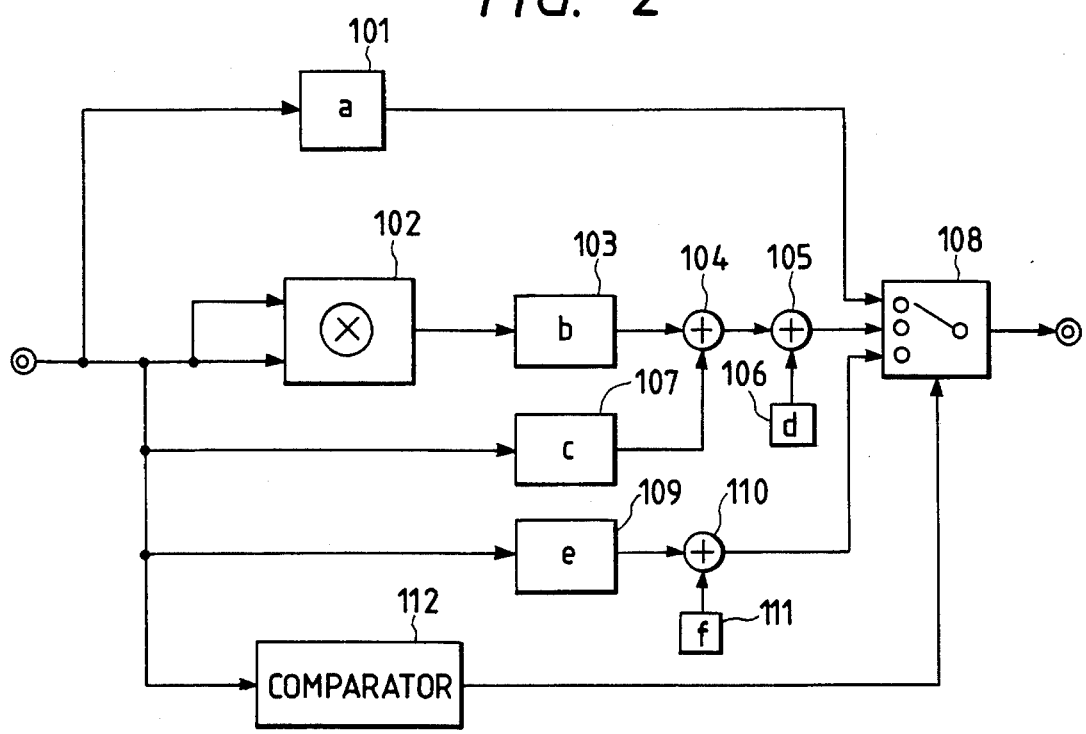
FIG. 2 is a block diagram of the gamma correction circuit shown in FIG. 1.

FIG. 2 is a block diagram of an embodiment of the gamma correction circuits 5 and 13 shown in FIG. 1.

In the diagram, reference numerals 101, 103, 107, and 109 denote coefficient devices used to multiply an input signal values of a, b, c and e, respectively. Reference numeral 102 denotes a multiplier; numerals 104, 105, and 110 denote adders; numeral 106 is a means for supplying a coefficient d; numeral 108 is a selector used as a selecting means; numeral 111 is a means for supplying a coefficient f; and numeral 112 is a comparator used as a comparing means.

The input signal is first multiplied by a coefficient of value a by the coefficient device 101 and is supplied to a first input terminal of the selector 108. The coefficient device 101 comprises a first function forming means.

The input signal is also multiplied by itself by the multiplier 102 and is then multiplied by a coefficient of value b by the coefficient device 103. A value of c is multiplied The input signal is also multiplied by a coefficient of value c by the coefficient device 107. An output signal of the coefficient device 103 is added to an output signal of the coefficient device 107 by the adder 104. The coefficient d from device 106 is added to an output signal of the adder 104 by the adder 105. An output signal of the adder 105 is supplied to a second input terminal of the selector 108. The multiplier 102, coefficient devices 103 and 107, adder 104, coefficient device d, and adder 105 comprise a second function forming means.

The input signal is also multiplied by a coefficient of value e by the coefficient device 109. A coefficient f from the coefficient supplying means 111 is added to an output signal of the coefficient device 109 by the adder 110. An output signal of the adder 110 is supplied to a third input terminal of the selector 108. The coefficient device 109, coefficient device 111, and adder 110 comprise a third function forming means.

The input signal is compared with predetermined signal values ($x_1$ and $x_2$ which will be described shortly) by the comparator 112. On the basis of the result of the comparison, either one of the first, second, and third inputs of the selector 108 is selected and generated as a gamma correction output.

Figure 3:
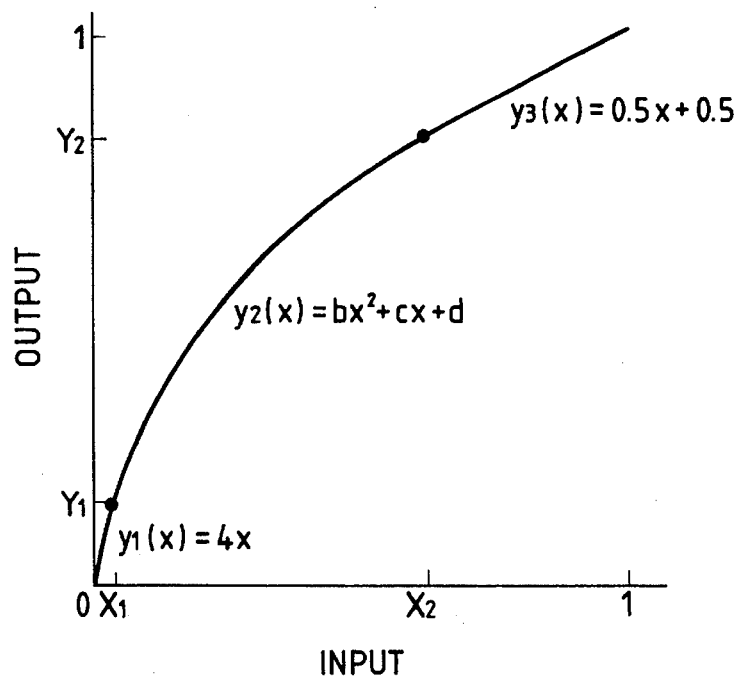
FIG. 3 is a graph showing gamma characteristics of the gamma correction circuit shown in FIG. 2.

FIG. 3 is a graph showing gamma characteristics of the gamma correction circuit shown in FIG. 2.

A television camera has the following gamma characteristic.

$$y=x^{0.45}$$

When the above gamma characteristic is approximated as shown in FIG. 3 by using a first straight line $y_1(x)$ (first function) of 0 to $x_1$, a quadratic curve $y_2(x)$ (second function) of $x_1$ to $x_2$, and a second straight line $y_3(x)$ (third function) of $x_2$ to 1, the following equations (1) to (3) are obtained, respectively.

$$y_1(x)=ax \tag{1}$$

$$y_2(x)=bx^2+cx+d \tag{2}$$

$$y_3(x)=ex+f \tag{3}$$

First, a=4, e=0.5, and f=0.5 are obtained by the inclinations near x=0 and x=1 of the gamma characteristic.

Subsequently, in order to continuously and smoothly connect the boundaries of the above respective functions, it is desirable to obtain the following equations (4) to (7), in which a mark (') denotes a differentiation.

$$y_1(x_1)=y_2(x_1) \tag{4}$$

$$y_1'(x_1)=y_2'(x_1) \tag{5}$$

$$y_3(x_2)=y_2(x_2) \tag{6}$$

$$y_3'(x_2)=y_2'(x_2) \tag{7}$$

By substituting the above equations (4) to (7) in equations (1) to (3), the following equations (8) to (11) are obtained.

$$4x_1=bx_1^2+cx_1+d \tag{8}$$

$$4=2bx_1+c \tag{9}$$

$$0.5x_2+0.5=bx_2^2+cx_2+d \tag{10}$$

$$0.5=2bx_2+c \tag{11}$$

In the equations (8) to (11), by using $x_1$ as a parameter, $x_2$, b, c, and d can be obtained.

By substituting the resultant values of a, b, c, d, e, and f as coefficients in the coefficient devices 101, 103, 107, 106, 109 and 111, respectively, in FIG. 2, and by substituting the values in $x_1$ and $x_2$ as set values of the comparator 112 in FIG. 2, the gamma characteristics of FIG. 3 can be realized.

Figure 4:
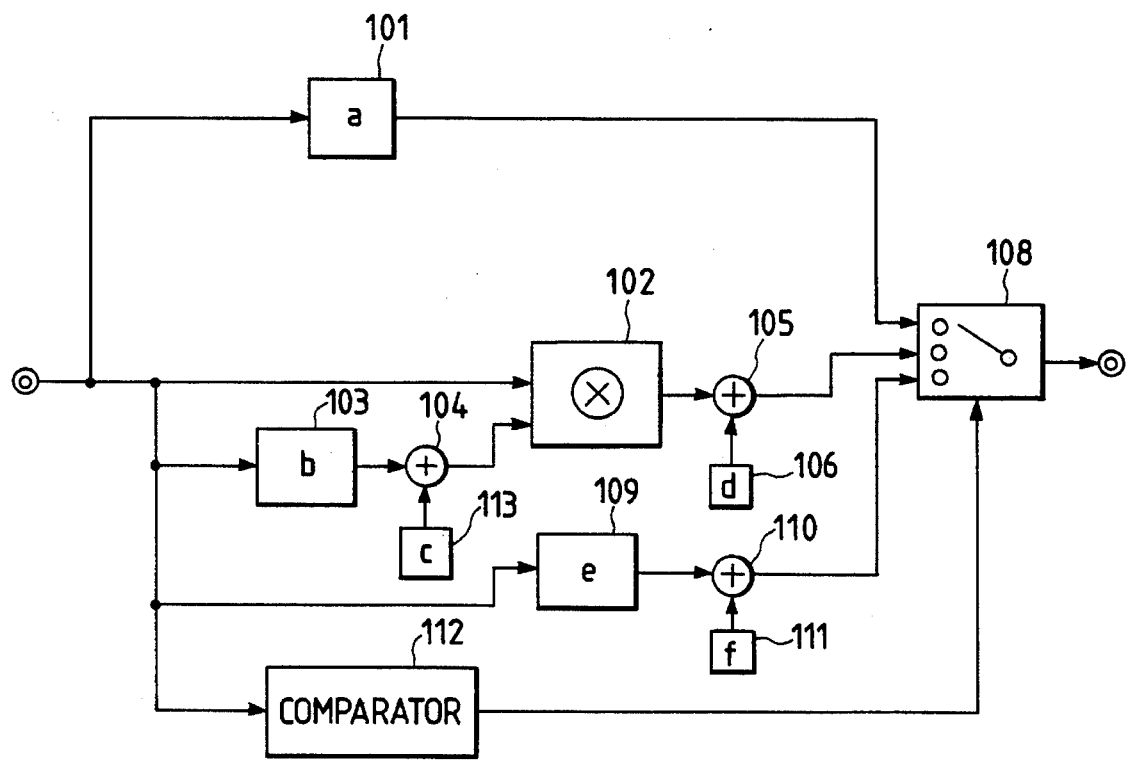
FIG. 4 is a block diagram of another embodiment of the gamma correction circuit shown in FIG. 1.

FIG. 4 is a block diagram of another embodiment of the gamma correction circuits 5 and 13 shown in FIG. 1. In FIG. 4, the same component elements as those shown in FIG. 2 are designated by the same reference numerals and their descriptions are omitted.

In the diagram, reference numeral 113 denotes a coefficient device c. In the embodiment, the coefficient device 103, adder 104, coefficient device 113, multiplier 102, coefficient device 106, and adder 105 comprises the second function forming means.

The input signal is first multiplied by a coefficient of value a by the coefficient device 101, and a resultant output signal is supplied to the first input terminal of the selector 108.

The input signal is also multiplied by a coefficient of value b by the coefficient device 103. The coefficient c from device 113 is added to a resultant output signal of the coefficient device 103 by the adder 104. An output signal of the adder 104 is multiplied by the input signal by the multiplier 102 and its output signal is added with the coefficient d from device 106 by the adder 105. A resultant output signal of the adder 105 is supplied to the second input terminal of the selector 108.

The input signal is also multiplied by a coefficient of value e by the coefficient device 109. The coefficient f from device 111 is added to an output signal of the coefficient device 109 by the adder 110. An output signal of the adder 110 is supplied to the third input terminal of the selector 108.

The input signal is compared with the predetermined values ($x_1$ and $x_2$ mentioned above) by the comparator 112. On the basis of the result of the comparison, either one of the first to third inputs of the selector 108 is selected and generated as a gamma correction output.

In FIG. 4, when it is assumed that the first, second, and third inputs of the selector 108 are set to $y_4$ (first function), $y_5$ (second function), and $y_6$ (third function), respectively, the following equations (12), (13), and (14) are obtained.

$$y_4 = ax \tag{12}$$

$$y_5 = (bx+c)x+d \tag{13}$$

$$y_6 = ex+f \tag{14}$$

The developed equation (13) is developed the same as equation (2) and the characteristics of FIG. 3 can be obtained in a manner similar to obtaining the characteristics of the circuit of FIG. 2. When comparing the circuit of FIG. 4 with the circuit of FIG. 2, since the number of coefficient devices can be reduced, a circuit scale can be further reduced.

As described above, according to the embodiment, since the gamma correction circuit can be constructed without using a ROM, the circuit scale can be reduced resulting in a large advantage such that costs and an electric power consumption can be reduced and the apparatus can be miniaturized.

There is also an advantage such that by making the function values coincide at a switching point of the function and also by making the inclinations of the functions coincide, a deterioration of the picture quality due to the switching doesn't occur.

What is claimed is:

1. A gamma correction apparatus, comprising:
   (a) a plurality of operation means for forming a plurality of functional signals for together providing a gamma correction conversion of an entire range of levels of an input signal, each of said operation means at least multiplying the input signal by a respective coefficient to form one of the plurality of functional signals; and
   (b) selecting means for selecting one of the plurality of functional signals, depending on a variation of the level of the input signal to form a combined gamma curve by combining said plurality of functional signals.

2. A gamma correction apparatus according to claim 1, wherein at least one of said plurality of operation means further comprises an adding circuit.

3. A gamma correction apparatus according to claim 1, wherein at least one of said plurality of operation means further comprises a squaring circuit.

4. A gamma correction apparatus, comprising:
   (a) a plurality of operation means for operating on an input signal to form a plurality of functional signals for together providing a gamma correction conversion of an entire range of levels of the input signal, wherein at least one of said plurality of operation means comprises an adding circuit for adding a coefficient to the input signal; and
   (b) selecting means for selecting one of the plurality of functional signals, depending on a variation of the level of the input signal to form a combined gamma curve by combining said plurality of functional signals.

5. A gamma correction apparatus according to claim 4, wherein each of said plurality of operation means comprises a multiplying circuit for multiplying an input signal by a respective coefficient to form a respective one of the plurality of functional signals.

6. A gamma correction apparatus according to claim 4, wherein at least one of said plurality of operation means comprises a squaring circuit.

* * * * *

UNITED STATES PATENT AND TRADEMARK OFFICE
CERTIFICATE OF CORRECTION

PATENT NO. : 5,481,317
DATED : January 2, 1996
INVENTOR(S) : Teruo Hieda

It is certified that error appears in the above-indentified patent and that said Letters Patent is hereby corrected as shown below:

COLUMN 1

Line 23, "an" should be deleted;

Line 24, "a" should be deleted;

Line 27, "has" should read --have--; and

Line 39, "size" should read --size of--.

COLUMN 2

Line 39, "balance;" should read --balance-- and "color signal" should read --color signals:--; and Line 40, "circuit a time-" should read --circuit a performs a time- --.

COLUMN 3

Line 4, "orthogonal" should be deleted;

Line 13, "signal" should read --signal by--; and

Line 27, "A value of C is multiplied" should be deleted.

COLUMN 4

Line 14, "$y_3'(x_2) = y_2'(x_2)$" should read
--$y_3'(x_2) = y_2'(x_2)$ . . . . . (7)--;

UNITED STATES PATENT AND TRADEMARK OFFICE
CERTIFICATE OF CORRECTION

PATENT NO. : 5,481,317
DATED : January 2, 1996
INVENTOR(S) : Teruo Hieda

It is certified that error appears in the above-indentified patent and that said Letters Patent is hereby corrected as shown below:

COLUMN 4, Cont'd.

Line 30, "of" should read --in--; and

Line 40, "comprises" should read --comprise--.

Signed and Sealed this

Twenty-first Day of May, 1996

Attest:

BRUCE LEHMAN

*Attesting Officer*     *Commissioner of Patents and Trademarks*